(12) United States Patent
Bonaceto

(10) Patent No.: US 6,959,897 B2
(45) Date of Patent: Nov. 1, 2005

(54) LOW COST PARACHUTE

(75) Inventor: Bruce Bonaceto, Southborough, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 16 days.

(21) Appl. No.: 10/779,484

(22) Filed: Feb. 12, 2004

(65) Prior Publication Data

US 2005/0178917 A1    Aug. 18, 2005

(51) Int. Cl.⁷ .............................................. B64D 17/10
(52) U.S. Cl. ..................................................... 244/145
(58) Field of Search .............................. 244/137.1, 142, 244/145, 147

(56) References Cited

U.S. PATENT DOCUMENTS

| | | | |
|---|---|---|---|
| 2,745,615 A | 5/1956 | Fogal | |
| 3,104,856 A | 9/1963 | Knacke et al. | |
| 3,127,137 A * | 3/1964 | Downing | 244/145 |
| 3,252,676 A * | 5/1966 | Frieder | 244/145 |
| 3,331,573 A * | 7/1967 | Winker et al. | 244/145 |
| 3,531,067 A * | 9/1970 | Mitchell | 244/145 |
| 4,664,342 A * | 5/1987 | Jones | 244/147 |
| 4,834,323 A | 5/1989 | Reuter | |
| 5,082,210 A | 1/1992 | Morehead | |
| 5,839,695 A | 11/1998 | Puskas | |
| 6,443,396 B1 | 9/2002 | Berland | |

* cited by examiner

Primary Examiner—Robert P. Swiatek
(74) Attorney, Agent, or Firm—Vincent J. Ranucci

(57) ABSTRACT

A parachute includes first strips of fabric configurable to define a pattern wherein the first strips are separated from each other and extend parallel to each other, and second strips of fabric configurable to further define the pattern wherein the second strips are separated from each other and extend parallel to each other and normal to the first strips, the number of first strips being equal to the number of second strips. The first and second strips cross each other to define vent holes. The ends of the strips are connected to suspension lines which are extendible to a confluence area for support of an article of cargo.

17 Claims, 3 Drawing Sheets

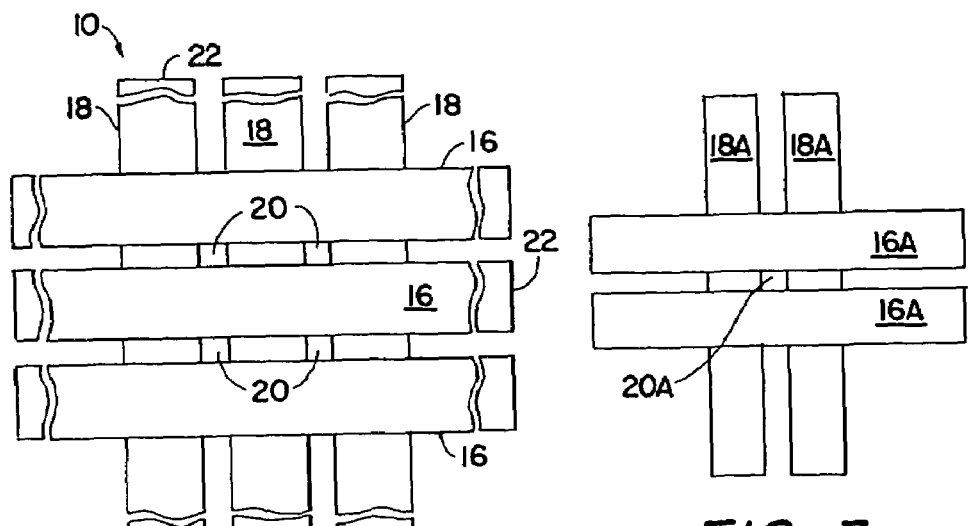
FIG. 2
FIG. 3
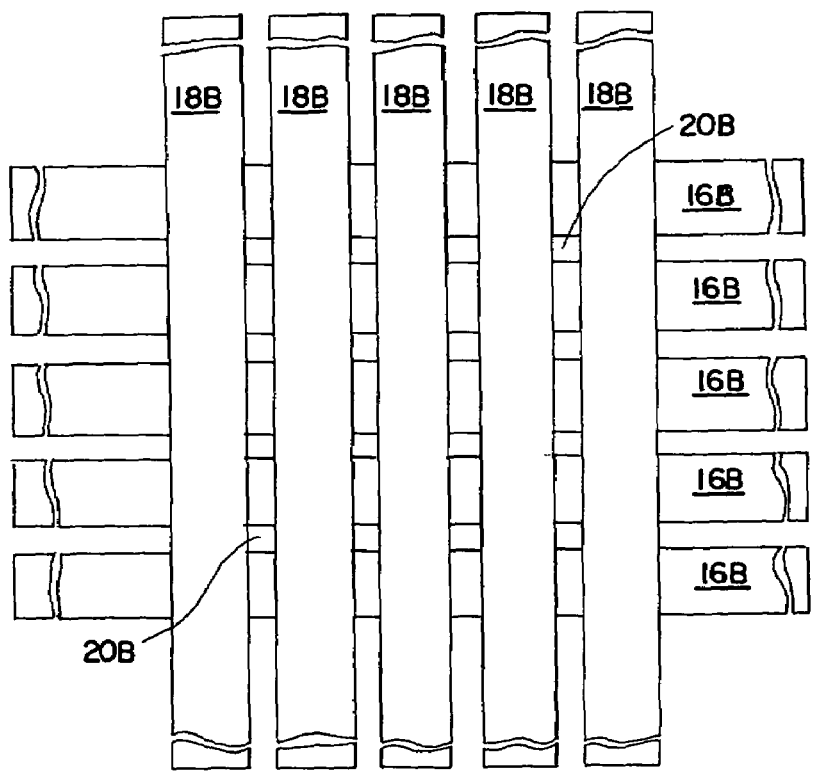
FIG. 4

LOW COST PARACHUTE

STATEMENT OF GOVERNMENT INTEREST

The invention described herein may be manufactured and used by the U.S. Government for Governmental purposes without the payment of any royalty thereon.

BACKGROUND OF THE INVENTION

1. Field of the Invention

The invention described and shown herein relates to parachutes and is directed more particularly to a low cost cargo parachute for use in providing water, food and supplies to areas unreachable by other means, for humanitarian relief, or for remote military operations.

2. Description of the Prior Art

In use, very few airdrop parachutes are returned for reuse. By and large, only in training does reuse of parachutes occur. Yet, parachutes are relatively expensive items.

Most cargo parachutes are round with numerous suspension lines attached to a skirt portion of the parachute fabric. A multitude of lines are sewn into the fabric to reinforce the fabric which itself is sewn together in pieces. A typical 26 foot high velocity cargo parachute is provided with 26 suspension lines. Much of the expense incurred in the manufacture of such parachutes is devoted to the many feet of lines used and the sewing together of small pieces of cloth and reinforcement tapes. Typically a parachute of this type must be vented so as to survive high opening forces at altitudes of 25,000 feet, or more. Present technology requires labor intensive methods to accomplish this.

A simpler, less expensive, parachute is a "cross chute" which includes two rectangular pieces of cloth sewn together in a cross shape. The stitching is simplified in a cross chute inasmuch as the stitching is principally in a straight line and larger pieces of fabric are joined together. Still, the cross chute requires many suspension lines and many reinforcement lines on the canopy.

Both types of parachutes utilize canopies which traditionally are of nylon, which usually is produced in 5 foot wide strips. The nylon pieces must be sewn together and reinforced with lines and tapes.

Considering that most parachutes are used only once in delivery of humanitarian and military supplies, it is deemed necessary that there be made available a much less expensive cargo parachute which offers acceptable performance.

SUMMARY OF THE INVENTION

Accordingly, an object of the invention is to provide a low cost parachute for cargo airdrops.

With the above and other objects in view, a feature of the invention is the provision of a parachute comprising a plurality of first strips of fabric adapted to define a pattern wherein the first strips are separated from each other and extend parallel to each other, and a plurality of second strips of fabric adapted to further define the pattern wherein the second strips are separated from each other and extend parallel to each other and normal to the first strips, the number of the second strips being equal to the number of the first strips. The first and second strips cross each other at center portions thereof and thereby define vent holes. The ends of the strips are connected to suspension lines which are extendible to a confluence area.

The above and other features of the invention, including various novel details of construction and combinations of parts, will now be more particularly described with reference to the accompanying drawings and pointed out in the claims. It will be understood that the particular parachutes embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings:

FIG. 2 is a top view of a canopy portion of the parachute of FIG. 1 disposed in a plane;

FIG. 3 is similar to FIG. 2, but showing an alternative embodiment;

FIG. 4 is similar to FIGS. 2 and 3, but illustrative of another alternative embodiment.

DESCRIPTION OF THE PREFERRED EMBODIMENTS

Figure 1:
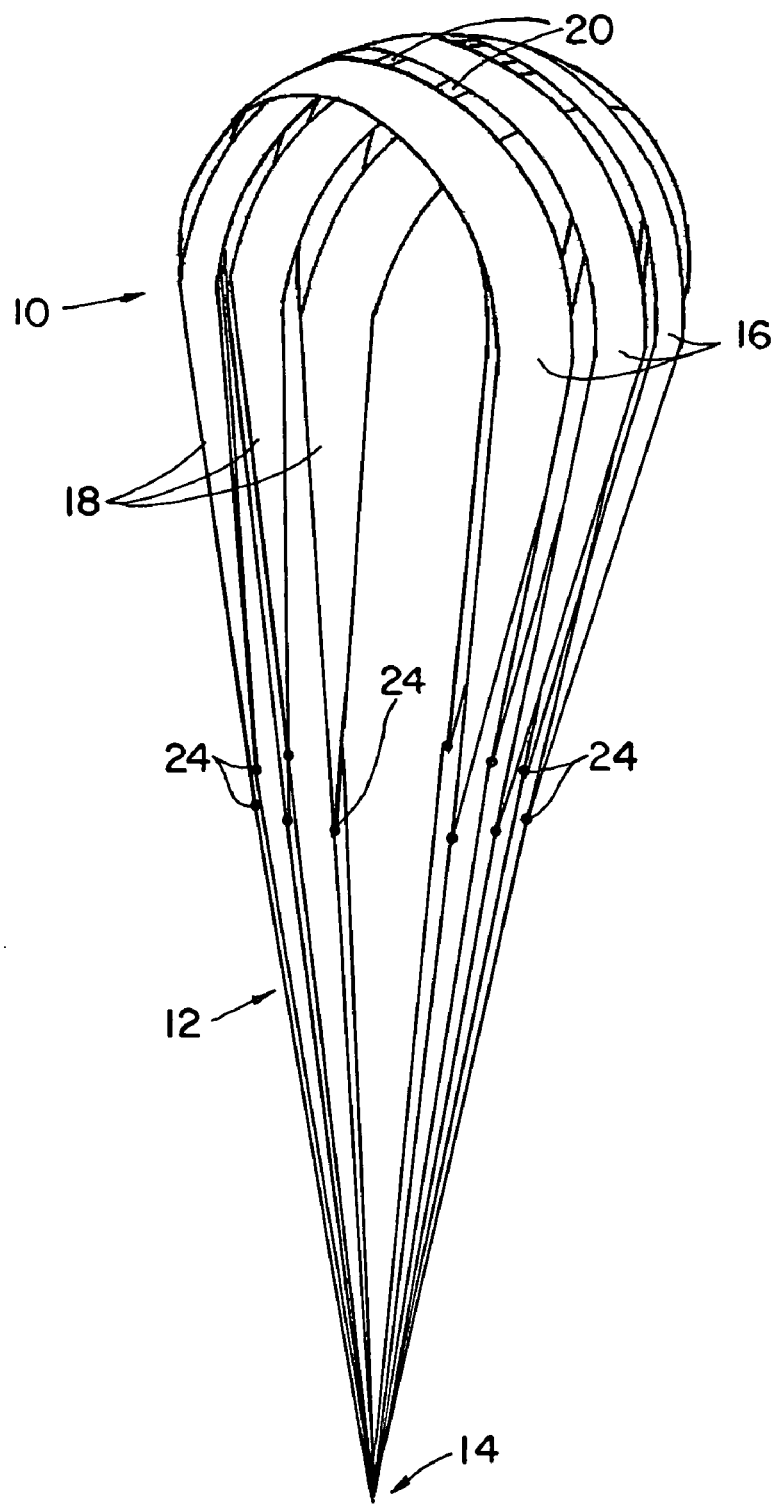
FIG. 1 is a perspective view of one form of parachute illustrative of an embodiment of the invention.

Referring to FIG. 1, it will be seen that an illustrative parachute includes a canopy 10 and suspension lines 12 fixed at one end to the canopy 10 and extendible toward a confluence area 14.

As shown in FIG. 2, the canopy 10 is formed by a plurality of first strips 16 of fabric, preferably woven polypropylene. The strips 16 are separated from each other and extend parallel to each other. A plurality of second strips 18 of the same fabric are separated from each other and extend parallel to each other and are normal to the first strips 16.

In an embodiment provided to replace a prior art round 26 foot high velocity cargo chute (not shown), the strips 16, 18 preferably are three feet wide and fifty-one feet long. Inasmuch as woven polypropylene is produced in strips of three feet width, the stock material does not have to be sewn together to form larger pieces. The strips are cut to a desired length. The edges of the strips are finished during the making of the standard fabric used, and are strong enough to withstand tearing without the use of reinforcement lines or tapes. The woven polypropylene material exhibits a tear resistance of 40 to 65 pounds, whereas commonly used nylon exhibits a tear resistance of 5 to 10 pounds.

As best shown in FIG. 2, the strips 16, 18 cross each other in the center area of the canopy 10. Inasmuch as the strips 16 are separated from each other, and the strips 18 are similarly separated, the strips 16, 18 form vents 20, which serve to relieve the canopy of excessive forces which might damage the canopy or the article of cargo during opening. The arrangement of strips and the vents formed thereby has been found to provide gentle opening of the canopy with low opening shock, yet provide sufficient drag for a desired rate of descent.

The strips 16, 18 are sewn together at the areas of their crossing each other. Aside from this sewing, there is no sewing in the entire canopy.

The suspension lines 12 are ropes, each tied to a strip end 22 by a self-tightening slip knot 24 that extends around the strip end gathered fabric. One suspension line 12 is tied to each strip end. Thus, the parachute presented herein in FIGS. 1 and 2 requires twelve suspension lines. The round 26 foot parachute referred to hereinabove requires 26 suspension lines and the aforementioned cross parachute generally requires 20 suspension lines in this size. Chutes larger or smaller require correspondingly fewer lines than prior art round or cross parachutes. Inasmuch as the suspension lines 12 are tied to the strip ends 22, there are no additional attaching loops, reinforcements, ties or sewing for attachment of the suspension lines 12 to the canopy 10.

Referring to FIG. 3, it will be seen that a smaller version of the parachute of FIGS. 1 and 2 includes two first strips 16A and two second strips 18A. In this case, one vent 20A is provided and only eight suspension lines are required.

Thus, the parachute illustrated in FIGS. 1, 2, and 3 enables the use of stock widths of material without any reinforcement lines or tapes. The suspension lines are reduced in number and require no canopy lines or sewing for affixing the suspension lines. Aside from the area where the strips 16, 18 cross, there is no required sewing in the canopy of the present parachute.

Referring to FIG. 4, there is shown a low velocity version featuring five first strips 16B and five second strips 18B, providing sixteen vents 20B. In this embodiment, the strips preferably are 5 feet wide and 90 feet long.

The designs described above are scaleable and can be applied to smaller (FIG. 3) and larger (FIG. 4) parachutes to provide similar performance at a lower cost. The widths and lengths of the strips can be proportionally sized to fit larger and smaller chutes.

Tests of the parachute shown in FIGS. 1 and 2 have been conducted.

A parachute attached to a 1,500 pound load was dropped at 5,000 feet. The drop was successful. No damage to the parachute was experienced and a descent rate of 70 ft/sec. was observed. The desired range for high velocity cargo drops is 70–90 ft/sec.

The same parachute attached to a 2,200 pound load was dropped at 15,000 feet. The drop was successful. No damage to the parachute was experienced and the descent rate was clocked at 75 ft/sec.

The same parachute attached to a 2,200 pound load was dropped at 18,000 feet. The drop was successful. No damage to the parachute was observed. The descent rate was 70 ft/sec.

A newly fabricated parachute attached to a 2,200 pound load was dropped from an altitude of 25,000 feet. The drop was successful. Minor damage to one strip was noted. The descent rate was 75 ft./sec.

The parachute from the last drop was repaired and attached to a 2,200 pound load and dropped from 25,000 feet. The drop was successful.

Each drop was from a C-130 aircraft over the Yuma Proving Grounds. Subsequently, about 20 more successful air drops have been conducted at max load at 25,000 feet. One drop of the chute shown in FIG. 4 was conducted with 1,000 lbs. and performed well at a descent rate of 21 ft/sec.

The combined features of the above-described parachute allow the parachute to be produced for from one third to one half the cost of the standard round cargo parachute and provides a reduced impact velocity.

Figure 5:
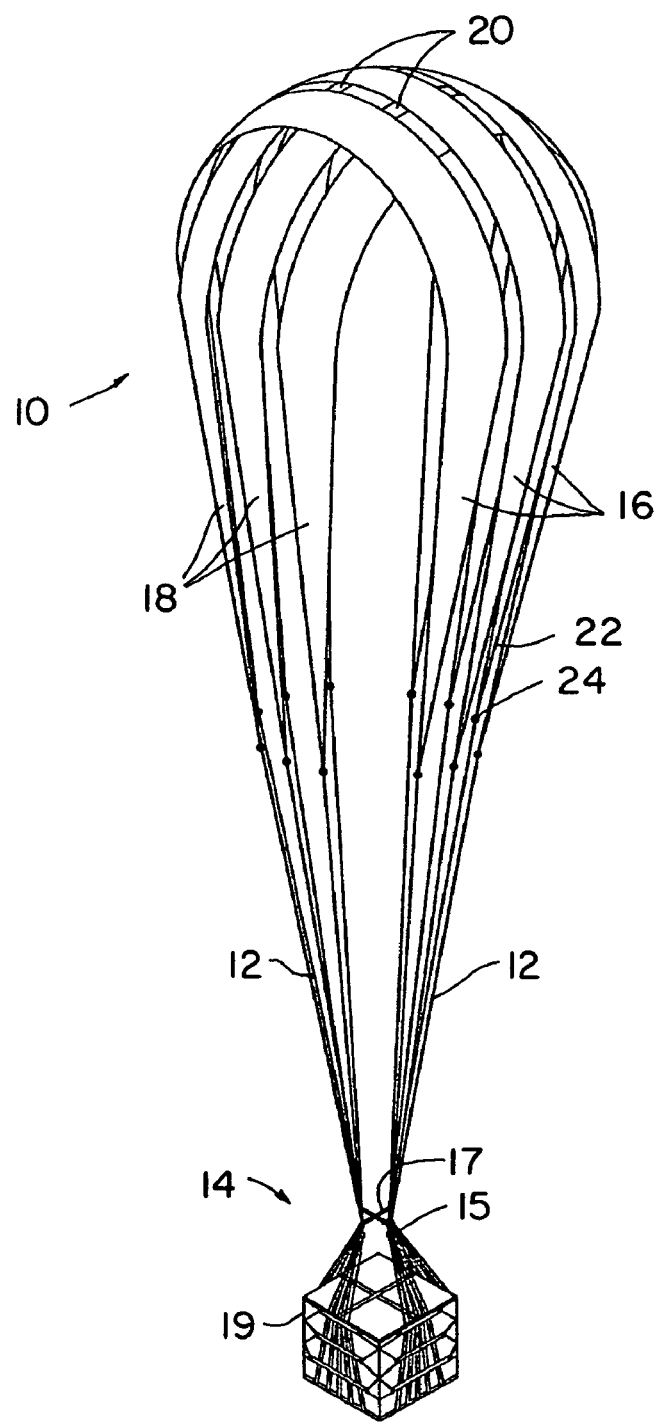
FIG. 5 is similar to FIG. 1, but showing a further alternative embodiment.

Referring to FIG. 5, it will be seen that the confluence area 14 may include D-rings 15, known in the art, and may include load spreaders 17. In the latter embodiment, each side of the canopy 10 is provided with a bundle of lines 12 routed through the load spreaders 17, and thence to the D-rings 15, which support an article 19 to be delivered. The lines 12 are fastened to the D-rings 15.

The load spreaders 17 are constructed of two pieces of nylon welding with a loop formed in each end. The load spreaders are bound together in an X pattern, providing four spaced end loops, through which pass the lines 12 extending to the D-rings 15. This arrangement permits the lines to adjust to a tumbling article 19 and to the proper opening of the parachute when carrying an article with uneven loading.

There is thus provided a new parachute providing a new geometry and a new method of construction. The new parachute is very low in costs, both in terms of materials and cost of production. The design remains applicable to scaled-up and scaled-down versions.

It will be apparent that when packed or deployed the parachute will not be laid out in the planar fashion shown in FIGS. 2–4. However, in the construction of the parachute the strips are arranged so that they are adapted to define the patterns shown in FIGS. 2–4.

It is to be understood that the present invention is by no means limited to the particular constructions herein disclosed and/or shown in the drawings, but also comprises any modification or equivalent within the scope of the claims.

What is claimed is:

1. A parachute comprising:
    a plurality of first strips of fabric adapted to define a pattern wherein the first strips are separated from each other and extend parallel to each other;
    a plurality of second strips of fabric adapted to further define the pattern wherein the second strips are separated from each other and extend parallel to each other and normal to the first strips, the number of the second strips being equal to the number of the first strips;
    said first and second strips crossing each other at center portions thereof and thereby defining vent holes, said first and second strips and vent holes being arranged for providing an opening of the parachute with low opening shock, and providing drag for a rate of descent; and
    ends of said first and second strips being gathered into points and connected to suspension lines extendible to a confluence area.

2. The parachute in accordance with claim 1 wherein the fabric exhibits a tear resistance greater than 30 pounds.

3. The parachute in accordance with claim 2 wherein the fabric exhibits a tear resistance greater than 40 pounds.

4. The parachute in accordance with claim 3 wherein the fabric comprises polypropylene with a tear resistance of 40–65 lbs.

5. The parachute in accordance with claim 1 wherein each of said strips in plan view is generally rectangularly shaped, less said ends of said strips connected to the suspension lines.

6. The parachute in accordance with claim 5 wherein said strips are sewn to each other where said first strips cross said second strips.

7. The parachute in accordance with claim 6 wherein said strips define a canopy devoid of reinforcing lines and tapes and devoid of sewing other than where said strips are sewn to each other.

8. The parachute in accordance with claim 1 wherein said pluralities of strips each comprise 2–5 strips.

9. The parachute in accordance with claim 8 wherein said pluralities of strips each comprise three strips so as to define four vent holes.

10. The parachute in accordance with claim 9 wherein each of said strips is about 3 feet wide and about 51 feet long.

11. The parachute in accordance with claim 8 wherein said pluralities of strips each comprise 5 strips and each of said strips is about 5 feet wide and about 90 feet long.

12. The parachute in accordance with claim 1 wherein the suspension lines comprise ropes, each suspension line being tied to an end of a said strip.

13. The parachute in accordance with claim 12 wherein one suspension line is tied to each strip, and said suspension rope and said end of said strip are tied together by a self-tightening knot that extends around gathered fabric at the strip end.

14. The parachute in accordance with claim 1 wherein the confluence area comprises load spreaders and D-rings, and wherein the suspension lines extend from the strip ends, through said load spreaders, and are attached to said D-rings which, in turn, support an article of cargo.

15. A method for making a parachute, the method comprising the steps of:
   arranging a plurality of first strips of high tear resistant material extending parallel to each other and spaced from each other;
   arranging a plurality of second strips of the material extending parallel to each other and spaced from each other, and extending normal to the first strips, with central portions of the first and second strips extending across each other;
   attachably fixing the first and second strips together where the first and second strips extend across each other;
   wherein the first and second strips are of equal width and equal length and the spacings thereof define vents, said first and second strips and vents being arranged for providing an opening of the parachute with low opening shock and providing drag for a rate of descent; and
   fixing suspension lines to points at gathered ends of said first and second strips, the suspension lines being extendible to a common confluence area; and wherein the fixing of the suspension lines to the ends of the strips comprises tying the suspension lines and the ends of the strips together with self-tightening knots.

16. The method in accordance with claim 15 wherein the fixing together of the first and second strips comprises stitching the first and second strips together.

17. The method in accordance with claim 15 wherein the high tear resistant material is woven polypropylene.

* * * * *